June 24, 1952   J. J. NEFF   2,601,447
ELECTRONIC CONCENTRICITY AND GROOVE PARALLEL GAUGE
Filed Sept. 11, 1945   2 SHEETS—SHEET 1
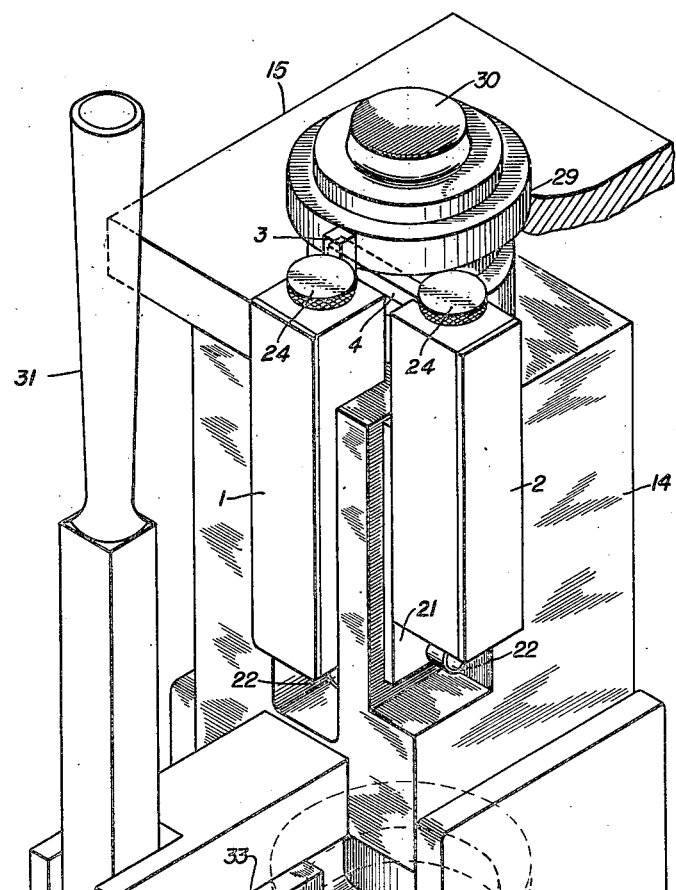
Fig. 1.
Fig. 4.
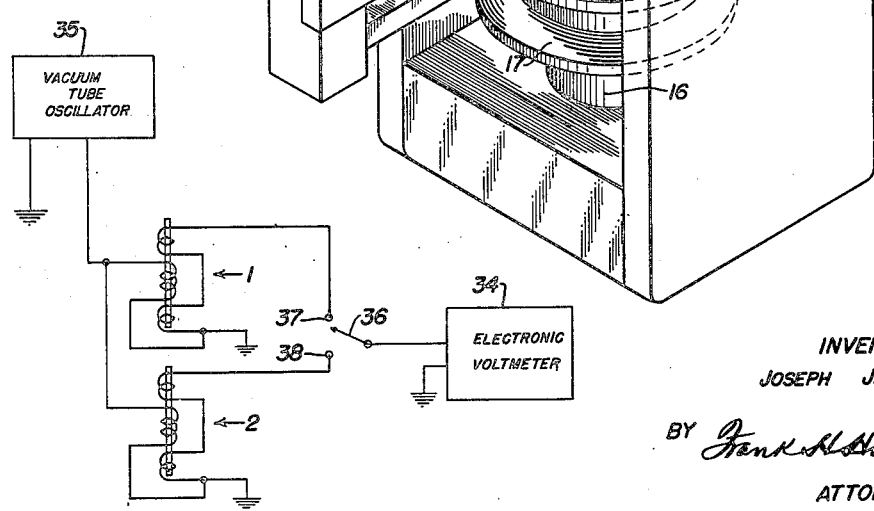
INVENTOR
JOSEPH J. NEFF
BY Frank H. Harmon
ATTORNEY June 24, 1952     J. J. NEFF     2,601,447
ELECTRONIC CONCENTRICITY AND GROOVE PARALLEL GAUGE
Filed Sept. 11, 1945     2 SHEETS—SHEET 2
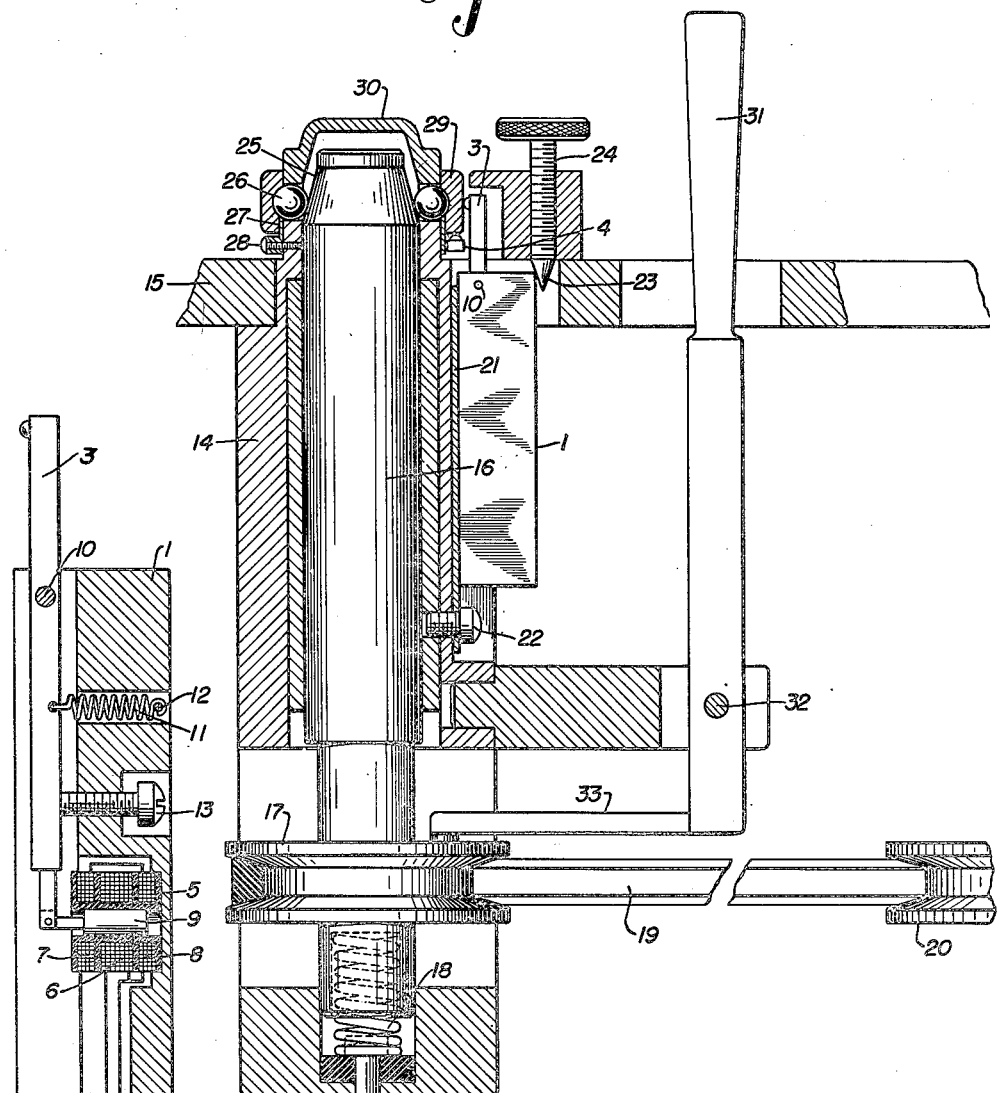
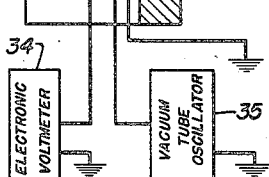
INVENTOR
JOSEPH J. NEFF
ATTORNEY Patented June 24, 1952

2,601,447

UNITED STATES PATENT OFFICE 2,601,447

ELECTRONIC CONCENTRICITY AND GROOVE PARALLEL GAUGE

Joseph J. Neff, South Euclid, Ohio, assignor, by mesne assignments, to Jack & Heintz Precision Industries, Inc., Cleveland, Ohio, a corporation of Delaware Application September 11, 1945, Serial No. 615,667

2 Claims. (Cl. 33—174)

This invention relates to measuring instruments and has for one of its primary objects to provide a precision instrument for a two-way measurement of groove concentricity to the outside diameter of an outer race and parallelism between the groove and an end face of the outer race of an anti-friction bearing assembly while rotating in the manner that it would when installed for its desired purpose.

A further object is to provide an electronic gauge for this purpose which will include one stylus for engaging the periphery of the outer bearing race and a separate stylus for engaging an edge of the race, each stylus carrying a separate armature and displacement pickup mechanism.

A further object is to provide a single oscillating circuit and a single electronic voltmeter with a single switching means for alternately switching on and off each pickup mechanism so as to alternately obtain readings on a single scale indicating the concentricity between the groove and the outer peripheral face of the ball bearing outer race and the parallelism between the groove and an end face of the race.

With the foregoing and other objects in view the invention resides in the combination of parts and in the details of construction set forth in the following description and appended claims, certain embodiments thereof being illustrated in the accompanying drawings in which:

Figure 1 is a view in perspective of the device showing the work being supported, the work ejecting lever, the pulley for rotating the work and the two displacement pickups, each with a stylus engaging the outer race at right angles to each other;

Figure 2 is a view in vertical section taken through the device as shown in Figure 1;

Figure 3 is a view in longitudinal section taken through one of the displacement pickups showing an individual oscillator and electronic voltmeter circuit; and Figure 4 is a diagrammatical showing of the two pickup units with a single oscillator and electronic voltmeter circuit and a switch for throwing either pickup unit in circuit therewith.

Referring more particularly to the drawings, the device includes two displacement pickup units generally indicated in the drawings at 1 and 2 each with a pivoted stylus, as shown at 3 and 4. As shown in detail in Figure 3, each displacement pickup is generally in accordance with the type shown in the United States patent to Joseph J. Neff, No. 2,361,788, dated October 31, 1944, for Displacement Pickup. It includes a coil form 5 for supporting a driving coil 6 and a pickup coil 7 on one side and a pickup coil 8 on the other side of the driving coil. An armature 9 is carried by a stylus arm 3 pivoted at 10 to move the armature longitudinally in either direction within the coils. The stylus arm is urged in a counterclockwise direction by a tension coil spring 11 anchored at 12 and an adjustable screw bolt 13 acts as a limit stop for counterclockwise pivoting of the stylus arm.

The instrument has a stationary support including an upright 14 and top portion 15. Suitably mounted for rotation in the support 14 is a shaft 16 and rigid with shaft 16 is a pulley 17. Shaft 16 rests on a compression coil spring 18 normally urging the shaft upwardly into the position in which it is shown in Figure 2. Pulley 17 is driven by a belt 19 which also engages a driving pulley 20.

The two pickup units are suitably secured to springy metal plates, such as shown at 21 which, in turn are secured near their lower ends to upright 14 by bolts 22 so as to urge the upper ends of the pickups outwardly toward screw 24. This gives a certain degree of flexibility of support for the pickup units permitting adjustment by the engagement of the conical tip 23 of set screw 24.

The upper end of shaft 16 is bevelled at 25 to be engaged by surface contact by a plurality of anti-friction ball bearings 26 which are retained by a ring 27 secured at 28 to the frame 14. The balls engage by surface contact the inner surface of the outer ball bearing race 29. The member 30 is merely a removable cover plate.

As stated before, Figures 1 and 2 show the bearing race 29 and the instrument with stylus 3 in position for engaging the periphery of the race for measuring its concentricity and stylus 4 in position for engaging the under side of the race for measuring the concentricity between the groove and the outer peripheral face of a ball bearing outer race and the parallelism between the groove and an end face of the race, while engaging the ball bearings and while shaft 16 is being rotated to simulate the conditions to which the bearing race is to be put in actual practice. In order to remove the bearing race a manual handle 31 is provided which is rotated in a counterclockwise direction about its pivot 32 to have its arm 33 press pulley 17 downwardly and consequently shaft 16 downwardly against the action of spring 18. This brings the top of the bevelled portion of the shaft of lesser diameter opposite the balls permitting easy removal of the race.

In actual practice adjustment of each pickup unit is made by such set screws as 24 and the pressure of its conical tip against the pickup unit and the stylus of each is adjusted against the action of spring 12 by set screws 13 to bring the armature 9 in an exact electrical center position with respect to coils 6, 7 and 8 so that the opposing induced voltages in pickup coils 7 and 8 counterbalance each other and no indication of measurement is given by the electronic voltmeter.

Figure 3 also shows the same circuit including leads from the three coils and the vacuum tube oscillator 35 and electronic voltmeter 34 as shown in the above mentioned patent.

As stylus 3 engages the outer surface of bearing race 29 as the latter is being rotated, any lack of concentricity will cause stylus 3 to be pivoted clockwise about its pivot 10 against the action of spring 12. This brings about a displacement of armature 9 from its electrical center causing more voltage to be induced in one pickup coil than the other resulting in a corresponding reading on the dial of the electronic voltmeter. The same thing is true of pivotal movements of the horizontally disposed stylus 4 engaging the under side of bearing race 29 caused by wobble of race 29 as it is rotating.

If desired, a separate vacuum tube oscillator and electronic voltmeter may be employed for each pickup unit, as indicated in Figure 3 for pickup unit 1 and its stylus 3. However, Figure 4 shows diagrammatically an improved arrangement employing a single vacuum tube oscillator and a single electronic voltmeter. Here is shown a circuit including a wiring diagram of displacement pickup units 1 and 2 and a switch 36 thrown to engage contact 37 to bring unit 1 into circuit with the oscillator and voltmeter for measurement of concentricity of bearing race 29 through movements of stylus 3. Throwing of switch 36 to engage contact 38 takes pickup unit 1 out of circuit and pickup unit 2 into circuit with the oscillator and voltmeter for measurement of end play, or wobble of bearing race 29 through movements of stylus 4.

I claim:

1. In an electrical measuring instrument for measuring the concentricity between the groove and the outer peripheral face of a ball bearing outer race and the parallelism between the groove and an end face of the race while being rotated with the balls therein, including a rotatably driven shaft, the upper portion of which is tapered inwardly toward its upper end to receive said balls, spring means for normally urging said shaft upwardly to be snugly engaged by said balls in said race, means for mounting the balls in the race on said shaft, a pair of displacement pickup units each including a pair of pickup coils, a driving coil therebetween and an armature longitudinally slidable in each driving coil, each armature having a stylus, one stylus engaging the outer peripheral face of the race and the other stylus engaging the end face of the race.

2. In an electrical measuring instrument for measuring the concentricity between the groove and the outer peripheral face of a ball bearing outer race and the parallelism between the groove and an end face of the race while being rotated with the balls therein, including a rotatably driven shaft, the upper portion of which is tapered inwardly toward its upper end to receive said balls, spring means for normally urging said shaft upwardly to be snugly engaged by said balls in said race, manually operable means for forcing said shaft downwardly against the action of said spring means for relieving said snug engagement of said shaft with said balls to permit removal of said race from said shaft, means for mounting the balls in the race on said shaft, a pair of displacement pickup units each including a pair of pickup coils, a driving coil therebetween and an armature longitudinally slidable in each driving coil, each armature having a stylus, one stylus engaging the outer peripheral face of the race and the other stylus engaging the end face of the race.

JOSEPH J. NEFF.

REFERENCES CITED

The following references are of record in the file of this patent:

UNITED STATES PATENTS

| Number | Name | Date |
|---|---|---|
| 2,331,987 | Leatherman | Oct. 19, 1943 |
| 2,344,217 | Reason et al. | Mar. 14, 1944 |
| 2,361,788 | Neff | Oct. 31, 1944 |
| 2,408,689 | Seme | Oct. 1, 1946 |